United States Patent Office 2,882,292
Patented Apr. 14, 1959

2,882,292

PROCESS FOR THE PRODUCTION OF 1-KETO-CYCLO-OCTYL-2-ACETIC ACID

Otto Schlichting and Guenter Scheuerer, Ludwigshafen (Rhine), Germany, assignors to Badische Anilin- & Soda-Fabrik Aktiengesellschaft, Ludwigshafen (Rhine), Rhineland-Pfalz, Germany No Drawing. Application September 13, 1956
Serial No. 609,520

4 Claims. (Cl. 260—464)

This invention relates to a process for the production of 1-ketocyclo-octyl-2-acetic acid.

We have found that the hitherto unknown 1-ketocyclo-octyl-2-acetic acid is obtained in a simple manner by reacting a tertiary 2-aminomethylcyclo-octanone-(1), in the form of its salts or its quaternization products, with an alkali cyanide and saponifying the resultant 2-(cyanomethyl)-cyclo-octanone-(1).

The course of the reaction, when using 2-dimethylaminomethylcyclo-octanone-(2)-iodomethylate and sodium cyanide as initial materials, may be reproduced as follows:

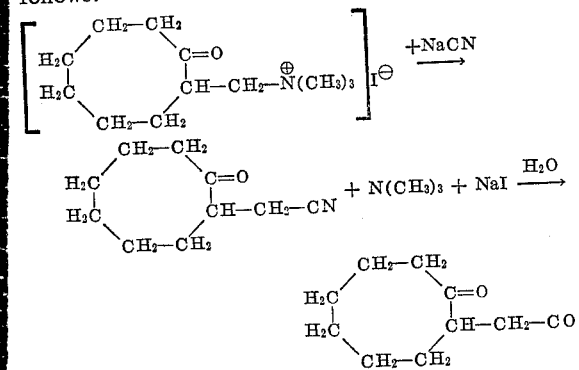

The tertiary 2-aminomethylcyclo-octanone-(1) can readily be prepared according to the principle of the so-called Mannich reaction by reaction of cyclo-octanone with formaldehyde and secondary amines, such as dimethylamine, diethylamine, methylethylamine, pyrrolidine, piperidine or morpholine. From these tertiary amines, the salts or quaternization products serving as initial materials for the present invention are obtained in known manner for example by reaction with hydrogen chloride, bromide or iodide or with methyl or ethyl iodide or bromide, with dimethyl sulfate or para-toluene sulfonic acid ethyl ester.

The reaction of the salts or quaternization products of the "Mannich bases" of cyclo-octanone with alkali cyanides is preferably carried out in aqueous or aqueous-alcoholic solution. The formation of the nitrile is carried out at a temperature at from about 20° up to 100° C., and is promoted by heating, for example, at 50° to 80° C., and by the use of an excess of sodium or potassium cyanide. The amine thereby set free in accordance with the above reaction scheme may be collected, when it is volatile under the reaction conditions, in dilute acid; in other cases it is recovered for example by fractional distillation.

The 2-(cyanomethyl)-cyclo-octanone-(1) obtained is a water-insoluble, colorless, liquid smelling of bitter almonds, which can be purified by distillation. It exhibits properties typical for a gamma-ketonitrile. It forms, for instance, a semicarbazone and can be saponified to the corresponding gamma-keto carboxylic acid.

The saponification of the nitrile is preferably effected by heating with aqueous caustic alkali solution. From the resultant solution of its alkali salt, the 1-ketocyclo-octyl-2-acetic acid is obtained by neutralization, for example with hydrochloric or sulfuric acid.

The new gamma-keto acid thus obtained and its water-soluble salts have cholagogic action which is shown to be considerably greater than that of dehydrocholic acid in experiments on guinea pigs.

The following examples will further illustrate this invention but the invention is not restricted to these examples. The parts specified are parts by weight.

*Example 1*

146 parts of 2-dimethylaminomethylcyclo-octanone-(1)-iodomethylate (melting point 182° to 184° C., prepared by reaction of 91 parts of 2-dimethylaminomethyl-cyclo-octanone-(1) with 106 parts of methyl iodide in ethyl acetate solution) are introduced into a solution of 66 parts of sodium cyanide in 1,320 parts of water while stirring. The originally clear solution is heated for about 100 minutes at 65° to 70° C., trimethylamine thereby escaping and 2-cyanomethylcyclo-octanone-(1) separating as an oil. It is allowed to cool, the oil is separated, the aqueous layer extracted with ether, the ether extract united with the oil, dried with sodium sulfate and the ether evaporated. The residue yields by distillation 68 parts of 2-cyanomethyl-cyclo-octanone-(1) of the boiling point 106° to 107° C., at a pressure of 0.3 Torr. The ketonitrile may be characterized by its semicarbazone which melts at 127° to 128° C.

68 parts of 2-cyanomethylcyclo-octanone-(1) are boiled under reflux with a solution of 115 parts of potassium hydroxide in 460 parts of water for 7 to 8 hours. After cooling, any unsaponified material is removed by extraction with ether, whereupon hydrochloric acid is added to the aqueous-alkaline layer until it gives an acid reaction to congo. The free 1-keto-cyclo-octyl-2-acetic acid in general separates at first as an oil. The aqueous layer is extracted with ether, the ether extract united with the oil, dried over sodium sulfate and the ether evaporated. 67 parts of 1-ketocyclo-octyl-2-acetic acid are obtained which after recrystallization from cyclohexane melts at 71° to 72° C. Its phenyl hydrazone has the melting point 109° to 110° C. (with decomposition).

*Example 2*

97 parts of 2-trimethylammonium-methylcyclo-octanone-(1)-methyl sulfate (melting point 99° C., prepared by reaction of 73 parts of 2-dimethylaminomethylcyclo-octanone-(1) with 252 parts of dimethyl sulfate in dry tetrahydrofurane with the addition of small amounts of glacial acetic acid at 10° to 15° C.) are reacted with a solution of 48 parts of sodium cyanide in 950 parts of water as in Example 1, there are obtained 36 parts of 2-cyanomethylcyclo-octanone-(1) and from this 36 parts of 1-ketocyclo-octyl-2-acetic acid.

*Example 3*

44 parts of 2-dimethylaminomethylcyclo-octanone-(1)-hydrochloride (melting point 138° to 139° C. with decomposition, prepared by leading dry hydrogen chloride into a solution of 40 parts of 2-dimethylaminomethylcyclo-octanone-(1) in 160 parts of absolute ethanol while cooling and precipitation with absolute ether) are reacted with a solution of 30 parts of sodium cyanide in 600 parts of water as in Example 1. There are obtained 18 parts of 1-ketocyclo-octyl-2-acetic acid.

*Example 4*

108 parts of 2-piperidinomethylcyclo-octanone-(1)-iodomethylate (melting point 126° to 128° C., prepared by heating a solution of 87 parts of 2-piperidinomethyl-cyclo-octanone-(1) in 160 parts of absolute ethanol with 82 parts of methyl iodide and precipitation with absolute ether) are reacted with a solution of 45 parts of sodium cyanide in 900 parts of water as in Example 1. There are obtained 30 parts of 1-ketocyclo-octyl-2-acetic acid.

What we claim is:
1. 1-ketocyclooctyl-2-acetic acid.
2. 2-(cyanomethyl)-cyclooctanone-(1).
3. A process for the production of 1-ketocyclooctyl-2-acetic acid which comprises reacting a compound of the general formula

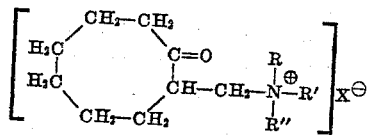

in which R is a member of the class consisting of hydrogen and lower alkyl groups, R'R"N represents the radical of a secondary amine selected from the class consisting of lower dialkyl amines, pyrrolidine, piperidine and morpholine, and X stands for a monovalent anion selected from the class consisting of halogen, alkylsulfate and aryl sulfonate anions, at from about 20° up to about 100° C. with an aqueous solution of an alkali metal cyanide and saponifying the 2-(cyanomethyl-)cyclooctanone-(1) thus obtained by means of aqueous caustic alkali.

4. The water-soluble salts of 1-ketocyclooctyl-2-acetic acid.

References Cited in the file of this patent

UNITED STATES PATENTS

| | | |
|---|---|---|
| 2,068,586 | Ziegler | Jan. 19, 1937 |
| 2,773,087 | Stork | Dec. 4, 1956 |

FOREIGN PATENTS

| | | |
|---|---|---|
| 934,103 | Germany | Oct. 13, 1955 |

OTHER REFERENCES

Snyder et al.: J.A.C.S., vol. 70, 1703–05 (1948).
Kuehl, Jr., et al.: Chem. Abst., vol. 45, 3328–29 (1951).
Blicke et al.: J.A.C.S., vol. 75, 5418 (1953).